S. RUSSELL.
APPLIANCE FOR TEACHING ARITHMETIC.
APPLICATION FILED JAN. 7, 1920.
1,405,010.
Patented Jan. 31, 1922.
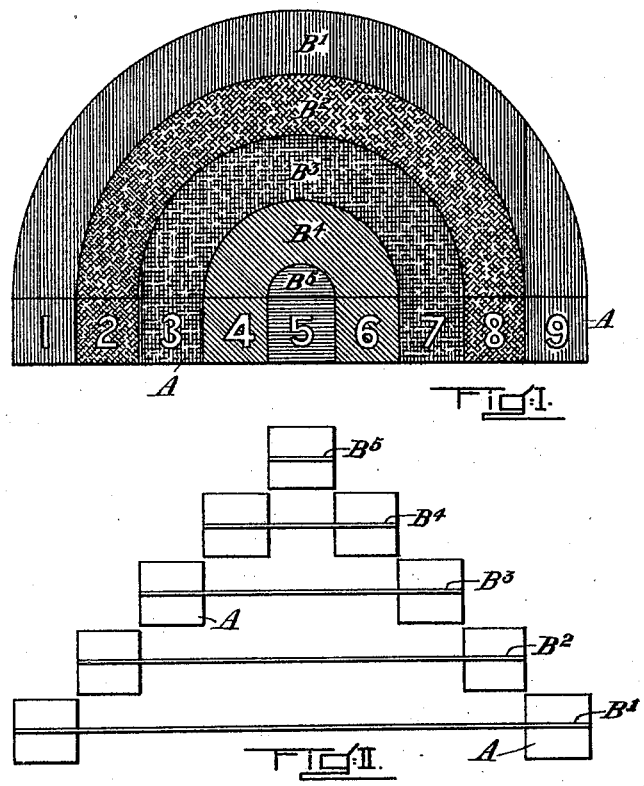
Inventor:
Sarian Russell
By Lawrence Langner
Attorney.

UNITED STATES PATENT OFFICE.

SARIAN RUSSELL, OF BEECROFT, NEW SOUTH WALES, AUSTRALIA.

APPLIANCE FOR TEACHING ARITHMETIC.

1,405,010.

Specification of Letters Patent.  Patented Jan. 31, 1922.

Application filed January 7, 1920. Serial No. 349,882.

*To all whom it may concern:*

Be it known that SARIAN RUSSELL, a subject of the King of Great Britain and Ireland, residing at Glendell, Malton Street, Beecroft, in the State of New South Wales, Australia, has invented certain new and useful Improvements in Appliances for Teaching Arithmetic, of which the following is a specification.

It is well known to teachers of young children that the best results are obtained by making use of object lessons, because the natural object itself, if the child's interest is awakened, will make a mental impression that will be difficult to efface.

The invention consists in the application of models of natural objects, especially with a view to teaching young children the first principles of the science of numbers, the objects, devices and numerals being so disposed, coloured and arranged that the child's attention shall be riveted upon the object so that its meaning and significance shall be apprehended and the faculty of initiative be cultivated.

The invention is illustrated in the accompanying drawings, in which:

Fig. I is a front view of a series of arches mounted on cubes and coloured to represent the colours of the spectrum.

Fig. II is a plan of the same.

In the drawings A, A, is a series of nine cubes adapted to be arranged in double echelon as shown; the cubes are numbered in consecutive order from 1 to 9; each cube will be provided on its upper face with means, such as a peg-hole or a slit, to receive the ends of a series of semi-circular arches, $B^1$, $B^2$, $B^3$, $B^4$, $B^5$, of progressively diminishing diameters, the cubes constituting the abutments of the arches which, when in position as shown, will represent a rainbow. Each arch will be coloured to one colour of the spectrum, the arch $B^1$, being coloured red, the arch $B^2$, orange, the arch $B^3$, yellow, the arch $B^4$, green, the arch $B^5$, blue; the violet colour will be absent, and is supposed to represent the number 10, which is the base number.

The arches being arranged as described and shown in the diagram, it will be remarked that the numbers on the two abutments of each arch will, when added together, total 10; there being only one abutment to the arch $B^5$, the number will be doubled thus making 10.

The cubes will be colored correspondingly to the arches of which they form the base.

What I claim is—

An educational appliance comprising a set of five arcuate members of different sizes adapted to fit together and colored to form, when assembled, a rainbow; and a set of terminal blocks for the arcuate members corresponding in color to the arcuate members to be matched therewith and each bearing a numerical notation, the latter successively progressing in value from one to nine, said arcuate members teaching by color-sense the sequence of the numerals from one to nine, and the numerical value of the pairs of similarly colored blocks when added together giving a total of ten.

In testimony whereof I affix my signature.

SARIAN RUSSELL.